US008634876B2

(12) United States Patent
Friedman et al.

(10) Patent No.: US 8,634,876 B2
(45) Date of Patent: Jan. 21, 2014

(54) LOCATION BASED DISPLAY CHARACTERISTICS IN A USER INTERFACE

(75) Inventors: Jonathan D. Friedman, Seattle, WA (US); Paula Guntaur, Seattle, WA (US); Michael K. Henderlight, Sammamish, WA (US); Rosanna H. Ho, Kirkland, WA (US); Michael J. Kruzeniski, Seattle, WA (US); Michael A. Smuga, Seattle, WA (US); Stephanie E. Teng, Seattle, WA (US); Chad Aron Voss, Seattle, WA (US); Brian M. Wilson, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 77 days.

(21) Appl. No.: 12/433,667

(22) Filed: Apr. 30, 2009

(65) Prior Publication Data
US 2010/0105439 A1 Apr. 29, 2010

Related U.S. Application Data

(60) Provisional application No. 61/107,945, filed on Oct. 23, 2008, provisional application No. 61/107,935, filed on Oct. 23, 2008, provisional application No. 61/107,921, filed on Oct. 23, 2008.

(51) Int. Cl.
*H04M 1/00* (2006.01)
*G06F 3/048* (2013.01)

(52) U.S. Cl.
USPC ........... 455/566; 715/863; 715/836; 715/800; 715/810; 715/902; 715/845; 715/841; 715/834; 715/817; 715/818; 715/819; 715/820; 715/825; 715/702

(58) Field of Classification Search
USPC ......................................... 455/566
See application file for complete search history.

(56) References Cited

U.S. PATENT DOCUMENTS 5,189,732 A 2/1993 Kondo
5,258,748 A 11/1993 Jones
(Continued)

FOREIGN PATENT DOCUMENTS

CN 1749936 3/2006
CN 1936797 3/2007
(Continued)

OTHER PUBLICATIONS

"International Search Report", Application No. PCT/US2010/028553, Application Filing Date: Mar. 24, 2010,(Nov. 9, 2010),9 pages.

(Continued)

*Primary Examiner* — Kent Chang
*Assistant Examiner* — Benjamin Morales Fernandez
(74) *Attorney, Agent, or Firm* — Wolfe-SBMC

(57) ABSTRACT

Location-based display characteristics in a user interface are described. In an implementation, a determination is made by mobile communications device that icon is to be displayed at a particular location in the user interface. A display characteristic is applied by the mobile communications device that is defined for the particular location such that a display of the icon is changed. The icon is displayed having an applied display characteristic on the display device of the mobile communications device at the particular location in the user interface.

19 Claims, 7 Drawing Sheets

(56) References Cited

U.S. PATENT DOCUMENTS

| | | | |
|---|---|---|---|
| 5,463,725 | A | 10/1995 | Henckel et al. |
| 5,515,495 | A * | 5/1996 | Ikemoto .................. 715/835 |
| 5,574,836 | A | 11/1996 | Broemmelsiek |
| 5,675,329 | A | 10/1997 | Barker |
| 5,860,073 | A | 1/1999 | Ferrel et al. |
| 5,905,492 | A | 5/1999 | Straub et al. |
| 5,914,720 | A | 6/1999 | Maples et al. |
| 5,963,204 | A | 10/1999 | Ikeda et al. |
| 6,008,816 | A | 12/1999 | Eisler |
| 6,385,630 | B1 | 5/2002 | Ejerhed |
| 6,396,963 | B2 | 5/2002 | Shaffer |
| 6,424,338 | B1 | 7/2002 | Andersone |
| 6,507,643 | B1 | 1/2003 | Groner |
| 6,570,582 | B1 | 5/2003 | Sciammarella et al. |
| 6,662,023 | B1 | 12/2003 | Helle |
| 6,697,825 | B1 | 2/2004 | Underwood et al. |
| 6,784,925 | B1 | 8/2004 | Tomat |
| 6,865,297 | B2 | 3/2005 | Loui |
| 6,876,312 | B2 | 4/2005 | Yu |
| 6,904,597 | B2 | 6/2005 | Jin |
| 6,961,731 | B2 | 11/2005 | Holbrook |
| 6,983,310 | B2 | 1/2006 | Rouse |
| 6,987,991 | B2 | 1/2006 | Nelson |
| 7,013,041 | B2 | 3/2006 | Miyamoto |
| 7,058,955 | B2 | 6/2006 | Porkka |
| 7,065,385 | B2 | 6/2006 | Jarrad et al. |
| 7,065,386 | B1 | 6/2006 | Smethers |
| 7,111,044 | B2 | 9/2006 | Lee |
| 7,133,707 | B1 | 11/2006 | Rak |
| 7,133,859 | B1 | 11/2006 | Wong |
| 7,139,800 | B2 | 11/2006 | Bellotti et al. |
| 7,158,123 | B2 | 1/2007 | Myers |
| 7,178,111 | B2 | 2/2007 | Glein et al. |
| 7,197,702 | B2 | 3/2007 | Niyogi et al. |
| 7,216,588 | B2 | 5/2007 | Suess |
| 7,249,326 | B2 | 7/2007 | Stoakley et al. |
| 7,280,097 | B2 | 10/2007 | Chen |
| 7,283,620 | B2 | 10/2007 | Adamczyk |
| 7,289,806 | B2 | 10/2007 | Morris et al. |
| 7,296,184 | B2 | 11/2007 | Derks et al. |
| 7,336,263 | B2 | 2/2008 | Valikangas |
| 7,369,647 | B2 | 5/2008 | Gao et al. |
| 7,388,578 | B2 | 6/2008 | Tao |
| 7,403,191 | B2 | 7/2008 | Sinclair |
| 7,447,520 | B2 | 11/2008 | Scott |
| 7,461,151 | B2 | 12/2008 | Colson et al. |
| 7,479,949 | B2 | 1/2009 | Jobs |
| 7,480,870 | B2 | 1/2009 | Anzures |
| 7,483,418 | B2 | 1/2009 | Maurer |
| 7,496,830 | B2 | 2/2009 | Rubin |
| 7,593,995 | B1 | 9/2009 | He et al. |
| 7,606,714 | B2 | 10/2009 | Williams et al. |
| 7,610,563 | B2 * | 10/2009 | Nelson et al. .................. 715/839 |
| 7,614,018 | B1 * | 11/2009 | Ohazama et al. ............. 715/862 |
| 7,619,615 | B1 | 11/2009 | Donoghue |
| 7,640,518 | B2 | 12/2009 | Forlines et al. |
| 7,657,849 | B2 | 2/2010 | Chaudhri et al. |
| 7,671,756 | B2 | 3/2010 | Herz et al. |
| 7,681,138 | B2 | 3/2010 | Grasser et al. |
| 7,702,683 | B1 | 4/2010 | Kirshenbaum |
| 7,730,425 | B2 * | 6/2010 | de los Reyes et al. ........ 715/835 |
| 7,746,388 | B2 | 6/2010 | Jeon |
| 7,755,674 | B2 | 7/2010 | Kaminaga |
| 7,834,861 | B2 | 11/2010 | Lee |
| 7,877,707 | B2 | 1/2011 | Westerman et al. |
| 7,889,180 | B2 | 2/2011 | Byun et al. |
| 7,983,718 | B1 | 7/2011 | Roka |
| 8,006,276 | B2 | 8/2011 | Nakagawa et al. |
| 8,086,275 | B2 | 12/2011 | Wykes |
| 8,131,808 | B2 | 3/2012 | Aoki et al. |
| 8,150,924 | B2 | 4/2012 | Buchheit et al. |
| 8,175,653 | B2 | 5/2012 | Smuga |
| 8,238,876 | B2 | 8/2012 | Teng |
| 8,250,494 | B2 | 8/2012 | Butcher |
| 8,255,473 | B2 | 8/2012 | Eren et al. |
| 8,269,736 | B2 | 9/2012 | Wilairat |
| 8,280,901 | B2 | 10/2012 | McDonald |
| 8,289,688 | B2 | 10/2012 | Behar et al. |
| 8,355,698 | B2 | 1/2013 | Teng et al. |
| 8,385,952 | B2 | 2/2013 | Friedman et al. |
| 8,411,046 | B2 | 4/2013 | Kruzeniski et al. |
| 8,448,083 | B1 | 5/2013 | Migos et al. |
| 8,548,431 | B2 | 10/2013 | Teng et al. |
| 2001/0022621 | A1 | 9/2001 | Squibbs |
| 2002/0000963 | A1 | 1/2002 | Yoshida et al. |
| 2002/0018051 | A1 | 2/2002 | Singh |
| 2002/0035607 | A1 | 3/2002 | Checkoway |
| 2002/0060701 | A1 | 5/2002 | Naughton et al. |
| 2002/0070961 | A1 | 6/2002 | Xu et al. |
| 2002/0091755 | A1 | 7/2002 | Narin |
| 2002/0128036 | A1 | 9/2002 | Yach et al. |
| 2002/0129061 | A1 | 9/2002 | Swart et al. |
| 2002/0138248 | A1 | 9/2002 | Corston-Oliver et al. |
| 2002/0142762 | A1 | 10/2002 | Chmaytelli et al. |
| 2002/0154176 | A1 | 10/2002 | Barksdale et al. |
| 2003/0003899 | A1 | 1/2003 | Tashiro et al. |
| 2003/0008686 | A1 | 1/2003 | Park et al. |
| 2003/0011643 | A1 | 1/2003 | Nishihata |
| 2003/0040300 | A1 | 2/2003 | Bodic |
| 2003/0073414 | A1 | 4/2003 | Capps |
| 2003/0096604 | A1 | 5/2003 | Vollandt |
| 2003/0105827 | A1 | 6/2003 | Tan et al. |
| 2003/0135582 | A1 | 7/2003 | Allen et al. |
| 2003/0187996 | A1 | 10/2003 | Cardina et al. |
| 2003/0222907 | A1 | 12/2003 | Heikes et al. |
| 2003/0225846 | A1 | 12/2003 | Heikes et al. |
| 2003/0234799 | A1 | 12/2003 | Lee |
| 2004/0015553 | A1 | 1/2004 | Griffin et al. |
| 2004/0068543 | A1 | 4/2004 | Seifert |
| 2004/0078299 | A1 | 4/2004 | Down-Logan |
| 2004/0111673 | A1 | 6/2004 | Bowman et al. |
| 2004/0185883 | A1 | 9/2004 | Rukman |
| 2004/0212586 | A1 | 10/2004 | Denny |
| 2004/0217954 | A1 | 11/2004 | O'Gorman et al. |
| 2004/0250217 | A1 * | 12/2004 | Tojo et al. ...................... 715/810 |
| 2005/0054384 | A1 | 3/2005 | Pasquale et al. |
| 2005/0060647 | A1 | 3/2005 | Doan et al. |
| 2005/0060665 | A1 * | 3/2005 | Rekimoto ..................... 715/810 |
| 2005/0079896 | A1 | 4/2005 | Kokko et al. |
| 2005/0085215 | A1 | 4/2005 | Kokko |
| 2005/0085272 | A1 | 4/2005 | Anderson et al. |
| 2005/0114788 | A1 | 5/2005 | Fabritius |
| 2005/0143138 | A1 | 6/2005 | Lee et al. |
| 2005/0182798 | A1 | 8/2005 | Todd et al. |
| 2005/0183021 | A1 | 8/2005 | Allen et al. |
| 2005/0184999 | A1 | 8/2005 | Daioku |
| 2005/0198159 | A1 | 9/2005 | Kirsch |
| 2005/0216300 | A1 | 9/2005 | Appelman et al. |
| 2005/0223057 | A1 | 10/2005 | Buchheit et al. |
| 2005/0232166 | A1 | 10/2005 | Nierhaus |
| 2005/0250547 | A1 | 11/2005 | Salman et al. |
| 2005/0273614 | A1 | 12/2005 | Ahuja |
| 2005/0280719 | A1 | 12/2005 | Kim |
| 2006/0004685 | A1 | 1/2006 | Pyhalammi et al. |
| 2006/0005207 | A1 | 1/2006 | Louch et al. |
| 2006/0015736 | A1 | 1/2006 | Callas et al. |
| 2006/0015812 | A1 | 1/2006 | Cunningham |
| 2006/0026013 | A1 | 2/2006 | Kraft |
| 2006/0059430 | A1 | 3/2006 | Bells |
| 2006/0070005 | A1 | 3/2006 | Gilbert et al. |
| 2006/0074771 | A1 | 4/2006 | Kim |
| 2006/0103623 | A1 | 5/2006 | Davis |
| 2006/0129543 | A1 | 6/2006 | Bates et al. |
| 2006/0135220 | A1 | 6/2006 | Kim et al. |
| 2006/0136773 | A1 | 6/2006 | Kespohl et al. |
| 2006/0152803 | A1 | 7/2006 | Provitola |
| 2006/0172724 | A1 | 8/2006 | Linkert et al. |
| 2006/0173911 | A1 | 8/2006 | Levin et al. |
| 2006/0199598 | A1 | 9/2006 | Lee et al. |
| 2006/0218234 | A1 | 9/2006 | Deng et al. |
| 2006/0246955 | A1 | 11/2006 | Nirhamo |
| 2006/0253801 | A1 | 11/2006 | Okaro et al. |
| 2006/0259870 | A1 | 11/2006 | Hewitt et al. |
| 2006/0259873 | A1 | 11/2006 | Mister |

(56) References Cited

U.S. PATENT DOCUMENTS

| | | | |
|---|---|---|---|
| 2006/0271520 A1 | 11/2006 | Ragan | |
| 2006/0281448 A1 | 12/2006 | Plestid et al. | |
| 2006/0293088 A1 | 12/2006 | Kokubo | |
| 2006/0294396 A1 | 12/2006 | Witman | |
| 2007/0005716 A1 | 1/2007 | LeVasseur et al. | |
| 2007/0011610 A1 | 1/2007 | Sethi et al. | |
| 2007/0015532 A1 | 1/2007 | Deelman | |
| 2007/0024646 A1 | 2/2007 | Saarinen | |
| 2007/0035513 A1 | 2/2007 | Sherrard et al. | |
| 2007/0038567 A1 | 2/2007 | Allaire et al. | |
| 2007/0054679 A1 | 3/2007 | Cho et al. | |
| 2007/0061306 A1 | 3/2007 | Pell et al. | |
| 2007/0061714 A1 | 3/2007 | Stuple et al. | |
| 2007/0067272 A1 | 3/2007 | Flynt | |
| 2007/0073718 A1 | 3/2007 | Ramer | |
| 2007/0076013 A1 | 4/2007 | Campbell | |
| 2007/0080954 A1 | 4/2007 | Griffin | |
| 2007/0082707 A1 | 4/2007 | Flynt et al. | |
| 2007/0082708 A1 | 4/2007 | Griffin | |
| 2007/0106635 A1 | 5/2007 | Frieden et al. | |
| 2007/0127638 A1 | 6/2007 | Doulton | |
| 2007/0150826 A1 | 6/2007 | Anzures et al. | |
| 2007/0150842 A1 | 6/2007 | Chaudhri et al. | |
| 2007/0157089 A1* | 7/2007 | Van Os et al. | 715/702 |
| 2007/0171192 A1 | 7/2007 | Seo et al. | |
| 2007/0171238 A1 | 7/2007 | Ubillos et al. | |
| 2007/0182595 A1 | 8/2007 | Ghasabian | |
| 2007/0185847 A1 | 8/2007 | Budzik et al. | |
| 2007/0192707 A1* | 8/2007 | Maeda et al. | 715/744 |
| 2007/0198420 A1 | 8/2007 | Goldstein | |
| 2007/0211034 A1 | 9/2007 | Griffin et al. | |
| 2007/0214422 A1 | 9/2007 | Agarwal et al. | |
| 2007/0214429 A1 | 9/2007 | Lyudovyk et al. | |
| 2007/0216651 A1 | 9/2007 | Patel | |
| 2007/0225022 A1 | 9/2007 | Satake | |
| 2007/0233654 A1 | 10/2007 | Karlson | |
| 2007/0238488 A1 | 10/2007 | Scott | |
| 2007/0247435 A1 | 10/2007 | Benko et al. | |
| 2007/0250583 A1 | 10/2007 | Hardy | |
| 2007/0253758 A1 | 11/2007 | Suess | |
| 2007/0255831 A1 | 11/2007 | Hayashi et al. | |
| 2007/0256029 A1 | 11/2007 | Maxwell | |
| 2007/0257891 A1 | 11/2007 | Esenther et al. | |
| 2007/0257933 A1 | 11/2007 | Klassen | |
| 2007/0262964 A1 | 11/2007 | Zotov et al. | |
| 2007/0263843 A1 | 11/2007 | Foxenland | |
| 2007/0273663 A1 | 11/2007 | Park et al. | |
| 2007/0280457 A1 | 12/2007 | Aberethy | |
| 2007/0281747 A1 | 12/2007 | Pletikosa | |
| 2008/0005668 A1 | 1/2008 | Mavinkurve | |
| 2008/0032681 A1 | 2/2008 | West | |
| 2008/0036743 A1 | 2/2008 | Westerman | |
| 2008/0048986 A1 | 2/2008 | Khoo | |
| 2008/0052370 A1 | 2/2008 | Snyder | |
| 2008/0057910 A1 | 3/2008 | Thoresson et al. | |
| 2008/0057926 A1 | 3/2008 | Forstall et al. | |
| 2008/0066010 A1* | 3/2008 | Brodersen et al. | 715/810 |
| 2008/0076472 A1 | 3/2008 | Hyatt | |
| 2008/0082934 A1 | 4/2008 | Kocienda et al. | |
| 2008/0084970 A1* | 4/2008 | Harper | 379/79 |
| 2008/0085700 A1 | 4/2008 | Arora | |
| 2008/0092057 A1 | 4/2008 | Monson et al. | |
| 2008/0102863 A1 | 5/2008 | Hardy | |
| 2008/0114535 A1 | 5/2008 | Nesbitt | |
| 2008/0120571 A1* | 5/2008 | Chang et al. | 715/810 |
| 2008/0132252 A1 | 6/2008 | Altman et al. | |
| 2008/0153551 A1 | 6/2008 | Baek et al. | |
| 2008/0155425 A1 | 6/2008 | Murthy et al. | |
| 2008/0162651 A1 | 7/2008 | Madnani | |
| 2008/0165132 A1 | 7/2008 | Weiss | |
| 2008/0165136 A1 | 7/2008 | Christie et al. | |
| 2008/0165163 A1 | 7/2008 | Bathiche | |
| 2008/0167058 A1 | 7/2008 | Lee et al. | |
| 2008/0168403 A1 | 7/2008 | Westerman et al. | |
| 2008/0172609 A1 | 7/2008 | Rytivaara | |
| 2008/0180399 A1 | 7/2008 | Cheng | |
| 2008/0182628 A1 | 7/2008 | Lee et al. | |
| 2008/0189658 A1 | 8/2008 | Jeong et al. | |
| 2008/0198141 A1 | 8/2008 | Lee et al. | |
| 2008/0200142 A1 | 8/2008 | Abdel-Kader et al. | |
| 2008/0208973 A1 | 8/2008 | Hayashi | |
| 2008/0222560 A1* | 9/2008 | Harrison | 715/800 |
| 2008/0222569 A1 | 9/2008 | Champion | |
| 2008/0242362 A1 | 10/2008 | Duarte | |
| 2008/0259042 A1 | 10/2008 | Thorn | |
| 2008/0261660 A1 | 10/2008 | Huh et al. | |
| 2008/0263457 A1 | 10/2008 | Kim et al. | |
| 2008/0270558 A1 | 10/2008 | Ma | |
| 2008/0297475 A1 | 12/2008 | Woolf et al. | |
| 2008/0299999 A1 | 12/2008 | Lockhart et al. | |
| 2008/0301046 A1 | 12/2008 | Martinez | |
| 2008/0301575 A1 | 12/2008 | Fermon | |
| 2008/0307364 A1* | 12/2008 | Chaudhri et al. | 715/836 |
| 2008/0309626 A1 | 12/2008 | Westerman et al. | |
| 2008/0316177 A1 | 12/2008 | Tseng | |
| 2008/0317240 A1 | 12/2008 | Chang et al. | |
| 2009/0007017 A1 | 1/2009 | Anzures et al. | |
| 2009/0012952 A1 | 1/2009 | Fredriksson | |
| 2009/0029736 A1 | 1/2009 | Kim et al. | |
| 2009/0037469 A1 | 2/2009 | Kirsch | |
| 2009/0051671 A1 | 2/2009 | Konstas | |
| 2009/0061837 A1 | 3/2009 | Chaudhri et al. | |
| 2009/0061948 A1 | 3/2009 | Lee et al. | |
| 2009/0064055 A1* | 3/2009 | Chaudhri et al. | 715/863 |
| 2009/0077649 A1 | 3/2009 | Lockhart | |
| 2009/0083656 A1 | 3/2009 | Dokhon | |
| 2009/0085851 A1 | 4/2009 | Lim | |
| 2009/0085878 A1 | 4/2009 | Heubel | |
| 2009/0089215 A1 | 4/2009 | Newton | |
| 2009/0106694 A1* | 4/2009 | Kraft et al. | 715/815 |
| 2009/0109243 A1 | 4/2009 | Kraft | |
| 2009/0117942 A1 | 5/2009 | Boningue et al. | |
| 2009/0140061 A1 | 6/2009 | Schultz et al. | |
| 2009/0140986 A1 | 6/2009 | Karkkainen et al. | |
| 2009/0146962 A1 | 6/2009 | Ahonen et al. | |
| 2009/0153492 A1 | 6/2009 | Popp | |
| 2009/0160809 A1 | 6/2009 | Yang | |
| 2009/0163182 A1 | 6/2009 | Gatti et al. | |
| 2009/0164888 A1 | 6/2009 | Phan | |
| 2009/0205041 A1 | 8/2009 | Michalske | |
| 2009/0228825 A1 | 9/2009 | Van Os et al. | |
| 2009/0265662 A1 | 10/2009 | Bamford | |
| 2009/0284482 A1 | 11/2009 | Chin | |
| 2009/0293014 A1* | 11/2009 | Meuninck et al. | 715/810 |
| 2009/0298547 A1 | 12/2009 | Kim et al. | |
| 2009/0307589 A1 | 12/2009 | Inose et al. | |
| 2009/0307623 A1 | 12/2009 | Agarawala et al. | |
| 2009/0313584 A1 | 12/2009 | Kerr et al. | |
| 2009/0315847 A1 | 12/2009 | Fujii | |
| 2010/0008490 A1 | 1/2010 | Gharachorloo et al. | |
| 2010/0075628 A1 | 3/2010 | Ye | |
| 2010/0079413 A1 | 4/2010 | Kawashima et al. | |
| 2010/0087169 A1 | 4/2010 | Lin | |
| 2010/0087173 A1 | 4/2010 | Lin | |
| 2010/0100839 A1 | 4/2010 | Tseng et al. | |
| 2010/0103124 A1 | 4/2010 | Kruzeniski | |
| 2010/0105370 A1 | 4/2010 | Kruzeniski | |
| 2010/0105424 A1 | 4/2010 | Smuga | |
| 2010/0105438 A1 | 4/2010 | Wykes | |
| 2010/0105440 A1 | 4/2010 | Kruzeniski | |
| 2010/0105441 A1 | 4/2010 | Voss | |
| 2010/0107067 A1 | 4/2010 | Vaisanen | |
| 2010/0107068 A1 | 4/2010 | Butcher | |
| 2010/0107100 A1 | 4/2010 | Schneekloth | |
| 2010/0145675 A1 | 6/2010 | Lloyd et al. | |
| 2010/0146437 A1 | 6/2010 | Woodcock et al. | |
| 2010/0159966 A1 | 6/2010 | Friedman | |
| 2010/0159994 A1 | 6/2010 | Stallings et al. | |
| 2010/0159995 A1 | 6/2010 | Stallings et al. | |
| 2010/0167699 A1 | 7/2010 | Sigmund et al. | |
| 2010/0180233 A1 | 7/2010 | Kruzeniski | |
| 2010/0216491 A1 | 8/2010 | Winkler et al. | |
| 2010/0248688 A1 | 9/2010 | Teng | |
| 2010/0248689 A1 | 9/2010 | Teng | |

(56) References Cited

U.S. PATENT DOCUMENTS

| | | | |
|---|---|---|---|
| 2010/0248741 A1 | 9/2010 | Setlur et al. |
| 2010/0248787 A1 | 9/2010 | Smuga |
| 2010/0295795 A1 | 11/2010 | Wilairat |
| 2010/0311470 A1 | 12/2010 | Seo et al. |
| 2010/0321403 A1 | 12/2010 | Inadome |
| 2011/0018806 A1 | 1/2011 | Yano |
| 2011/0055773 A1 | 3/2011 | Agarawala et al. |
| 2011/0093778 A1 | 4/2011 | Kim et al. |
| 2011/0231796 A1 | 9/2011 | Vigil |
| 2012/0028687 A1 | 2/2012 | Wykes |
| 2012/0050185 A1 | 3/2012 | Davydov et al. |
| 2012/0179992 A1 | 7/2012 | Smuga |
| 2012/0212495 A1 | 8/2012 | Butcher |
| 2012/0244841 A1 | 9/2012 | Teng |
| 2013/0102366 A1 | 4/2013 | Teng |

FOREIGN PATENT DOCUMENTS

| | | |
|---|---|---|
| CN | 101228570 | 7/2008 |
| CN | 102197702 | 9/2011 |
| EP | 0583060 | 2/1994 |
| EP | 1752868 | 2/2007 |
| JP | 2004227393 | 8/2004 |
| JP | 2004357257 | 12/2004 |
| JP | 2006139615 | 6/2006 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 20080084156 | 9/2008 |
| KR | 102008008415 | 9/2008 |
| KR | 1020080113913 | 12/2008 |
| KR | 1020090041635 | 4/2009 |
| TW | 201023026 | 6/2010 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |

OTHER PUBLICATIONS

"PCT Search Report and Written Opinion", Application No. PCT/US2010/034772, (Dec. 29, 2010),12 pages.
"PCT Search Report and Written Opinion", PCT Application No. PCT/US2010/038730, (Jan. 19, 2011),8 pages.
"PCT Search Report", Application Serial No. PCT/US2009/061864, (May 14, 2010),10 pages.
"PCT Search Report and Written Opinion", Application No. PCT/US2009/061382, (May 26, 2010),10 pages.
"PCT Search Report and Written Opinion", Application No. PCT/US2009/061735, (Jun. 7, 2010),11 pages.
"PCT Search Report and Written Opinion", Application No. PCT/US2010/028699, (Oct. 4, 2010),10 pages.
"PCT Search Report and Written Opinion", Application No. PCT/US2010/028555, (Oct. 12, 2010),10 pages.
Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004), 10 Pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008., (Apr. 2, 2008),1 page.
Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, (Sep. 3, 2002), 83 Pages.
Kcholi, Avi "Windows CE .NET Interprocess Communication", Retrieved from http://msdn.microsoft.com/en-us/library/ms836784.aspx on Jul. 17, 2008., (Jan. 2004),15 pages.
Gao, Rui "A General Logging Service for Symbian based Mobile Phones", Retrieved from: <http://www.nada.kth.se/utbildning/grukth/exjobb/rapportlisotr/2007/rapporter07/gao_rui_07132.pdf.> on Jul. 17, 2008, (Feb. 2007),pp. 1-42.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., 8 pages.
"Content-Centric E-Mail Message Analysis in Litigation Document Reviews", Retrieved from: http://www.busmanagement.com/article/Issue-14/Data-Management/Content-Centric-E-Mail-Messaqe-Analysis-in-Litigation-Document-Reviews/., (May 6, 2009),4 Pages.
Mao, Jeng "Comments of Verizon Wireless Messaging Services, LLC", Retrieved from: http://www.ntia.doc.gov/osmhome/warnings/comments/verizon.htm on May 6, 2009., 5 Pages.
"Oracle8i Concepts Release 8.1.5", Retrieved from: http://www.cs.umbc.edu/help/oracle8/server.815/a67781/c16queue.htm on May 6, 2009., 10 Pages.
"Oracle8i Application Developer's Guide—Advanced Queuing", Retrieved from: http://www.cs.umbc.edu/help/oracle8/server.815/a68005/03_adq1i.htm on May 6, 2009., 29 Pages.
"Microsoft Internet Explorer Window.Createpopup() Method Creates Chromeless Windows", Retrieved from: <http://www.addict3d.org/news/2012/download.html>, Internet Explorer Window Restrictions,(Oct. 22, 2008),6 pages.
"Kiosk Browser Chrome Customization Firefox 2.x", Retrieved from: <http://stlouis-shopper.com/cgi-bin/mozdev-wiki/,pl?ChromeCustomization> *Making a new chrome for the kiosk browser*, Kiosk Project Kiosk Browser Chrome Customization Firefox-2.x,(Aug. 16, 2007),2 pages.
Harrison, Richard "Symbian OS C++ for Mobile Phones: vol. 3 ( Symbian Press): 3 (Paperback)", Retrieved from: <http://www.amazon.co.uk/Symbian-OS-Mobile-Phones-Press/dp/productdescription/0470066415>, (Jun. 16, 2003),4 pages.
"How do you dial 1-800-FLOWERS", Retrieved from: <http://blogs.msdn.com/windowsmobile/archive/2007/02/06/how-do-you-dial-1-800-flowers.aspx>, (Feb. 6, 2007),24 pages.
"Blackberry office tools: Qwerty Convert", Retrieved from: <http://blackberrysoftwarelist.net/blackberry/download-software/blackberry-office/qwerty_convert.aspx>, (Nov. 20, 2008),1 page.
Gade, Lisa "Samsung Alias u740", Retrieved from: <http://www.mobiletechreview.com/phones/Samsung-U740.htm>, (Mar. 14, 2007),6 pages.
"Dial a number", Retrieved from: <http://www.phonespell.org/ialhelp.html> on Nov. 20, 2008, (Nov. 20, 2008),1 page.
"Apple IPhone—8GB AT&T", Retrieved from: <http://nytimes.com.com/smartphones/apple-iphone-8gb-at/4515-6452_7-32309245.html>, (Jun. 29, 2007),11 pages.
"IntelliScreen—New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/>, (May 13, 2008),11 pages.
"PocketShield-New Screenlock App for the HTC Diamond and Pro", Retrieved from: <http://wmpoweruser.com/?tag=htc-touch-diamond>, (Nov. 6, 2008),13 pages.
"SecureMe—Anti-Theft Security Application for S60 3rd", Retrieved from: <http://www.killermobile.com/newsite/mobile-software/s60-applications/secureme-%11-anti%11theft-security-application-for-s60-3rd.htm>, (Nov. 11, 2008),2 pages.

(56) References Cited

OTHER PUBLICATIONS

"Winterface Review", Retrieved from: <http://www.mytodayscreen.com/winterface-review/>, (Jul. 9, 2008),42 pages.

Oliver, Sam "Potential iPhone Usability and Interface Improvements", Retrieved from: <http://www.appleinsider.com/articles/08/09/18/potential_iphone_usability_and_in_terface_improvements.html>, (Sep. 18, 2008),4 pages.

"Google Android has Landed; T-Mobile, HTC Unveil G1", Retrieved from: <http://www.crn.com/retail/210603348> on Nov. 26, 2008., (Sep. 23, 2008),5 Pages.

"Alltel Adds Dedicated Search Key to Phones", Retrieved from: <http://www.phonescoop.com/news/item.php?n=2159> on Nov. 26, 2008., (Apr. 12, 2007),2 Pages.

Oryl, Michael "Review: Asus P527 Smartphone for North America", Retrieved from: <http://www.mobileburn.com/review.jsp?Id=4257> on Dec. 17, 2008., (Mar. 5, 2008),1 Page.

"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006),2 Pages.

Ha, Rick et al., "SIMKEYS: An Efficient Keypad Configuration for Mobile Communications", Retrieved from: <http://ieeexplore.ieee.org/stamp/stamp.jsp?arnumber=01362557.>, (Nov. 2004),7 Pages.

"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005),5 Pages.

"Palm Treo 750 Cell Phone Review—Hardware", Retrieved from: <http://www.wirelessinfo.com/content/palm-Treo-750-Cell-Phone-Review/Hardware.htm> on Dec. 11, 2008., (Mar. 17, 2007),4 Pages.

"Keyboard (5)", Retrieved from: <http://landru.uwaterloo.ca/cgi-bin/man.cgi?section=5&topic=keyboard> on Dec. 11, 2008., (Aug. 11, 1997),8 Pages.

"Calc4M", Retrieved from: <http://www.hellebo.com/Calc4M.html>, (Sep. 10, 2008),4 Pages.

"MIDTB Tip Sheet: Book Courier", Retrieved from: <http://www.midtb.org/tipsbookcourier.htm> on Dec. 11, 2008., (Sep. 26, 2005),6 Pages.

"Freeware .mobi", Retrieved from: <http://www.palmfreeware.mobi/download-palette.html>, (Oct. 9, 2001),2 pages.

"Palette Extender 1.0.2", Retrieved from: <http://palette-extender.en.softonic.com/symbian>, (Jan. 21, 2003),2 pages.

Rice, Stephen V., et al., "A System for Searching Sound Palettes", Retrieved from: <http://www.comparisonics.com/FindSoundsPalettePaper.pdf>, (Feb. 28-29, 2008),6 pages.

"Multi-touch", Retrieved from <http://en.wikipedia.org/wiki/Multi-touch#Microsoft_Surface>, (Apr. 17, 2009),8 pages.

Wilson, Tracy V., "How the iPhone Works", Retrieved from: <http://electronics.howstuffworks.com/iphone2.htm>, (Jan. 2007),9 pages.

"DuoSense™ Multi-Touch Gestures", Retrieved from: <http://www.n-trig.com/Data/Uploads/Misc/DuoSenseMTG_final.pdf>, (Jul. 2008),4 pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004),13 Pages.

Nordgren, Peder "Development of a Touch Screen Interface for Scania Interactor", Retrieved from: <http://www.cs.umu.se/education/examina/Rapporter/PederNordgren.pdf>, (Apr. 10, 2007),67 Pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009),pp. 1-2.

"Symbian Applications", Retrieved from: <http://symbianfullversion.blogspot.com/2008_12_01_archive.html> on May 5, 2009., (Jan. 2009),51 Pages.

Remond, Mickael "Mobile Marketing Magazine", Retrieved from: <http://www.mobilemarketingmagazine.co.uk/mobile_social_networking/> on May 5, 2009., (Apr. 28, 2009),16 Pages.

"Womma", Retrieved from: <http://www.womma.org/blog/links/wom-trends/> on May 5, 2009., (2007),70 Pages.

Dolcourt, Jessica "Webware", Retrieved from: <http://news.cnet.com/webware/?categoryId=2010> on May 5, 2009., (Apr. 2009),13 Pages.

"HTC Shows HTC Snap with Snappy Email Feature", Retrieved from: <http://www.wirelessandmobilenews.com/smartphones/> on May 5, 2009>, (May 4, 2009),10 Pages.

"Ask Web Hosting", Retrieved from: <http://www.askwebhosting.com/story/18501/HTC_FUZE_From_ATandampT_F_uses_Fun_and_Function_With_the_One-Touch_Power_of_TouchFLO_3D.html> on May 5, 2009., (Nov. 11, 2008),3 pages.

"Live Photo Gallery—Getting Started—from Camera to Panorama", Retrieved from <http://webdotwiz.spaces.live.com/blog/cns!2782760752B93233!1729.entry> on May 5, 2009., (Sep. 2008),7 Pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007),2 Pages.

Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (2006),4 Pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008),pp. 1-14.

"Mobile/UI/Designs/TouchScreen", Retrieved from: <https://wiki.mozilla.org/Mobile/UI/Designs/TouchScreen> on May 6, 2009., (Feb. 2009),15 Pages.

"Introduction to Windows Touch", Retrieved from: <http://download.microsoft.com/download/a/d/f/adf1347d-08dc-41a4-9084-623b1194d4b2/Win7_touch.docx>, (Dec. 18, 2008),7 Pages.

Terpstra, Brett "Beta Beat: Grape, a New Way to Manage Your Desktop Clutter", Retrieved from: *Beta Beat: Grape, a New Way to Manage Your Desktop Clutter* on May 6, 2009., (Apr. 14, 2009),16 Pages.

"Touch Shell Free", Retrieved from: <http://www.pocketpcfreeware.mobi/download-touch-shell-free.html> on May 5, 2009., (Feb. 23, 2009),2 Pages.

"Parallax Scrolling", Retrieved from: <http://en.wikipedia.org/wiki/Parallax_scrolling> on May 5, 2009., (May 4, 2009),3 Pages.

Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008),4 Pages.

Mann, Richard et al., "Spectrum Analysis of Motion Parallax in a 3D Cluttered Scene and Application to Egomotion", Retrieved from: <http://www.cs.uwaterloo.ca/~mannr/snow/josa-mann-langer.pdf.>, (Sep. 2005),15 Pages.

"Keyboard Shortcuts", Retrieved from: <http://www.pctoday.com/editorial/article.asp?article=articles%2F2005%2Ft0311%2F26t11%2F26t11.asp> on Aug. 3, 2009., (Nov. 2005),5 pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,382, (Jul. 26, 2011), 9 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/469,458, (Jul. 1, 2011), 15 pages.

(56) References Cited

OTHER PUBLICATIONS

"Non-Final Office Action", U.S. Appl. No. 12/484,799, (Aug. 11, 2011), 12 pages.
"Notice of Allowance", U.S. Appl. No. 12/414,458, (Aug. 10, 2011), 6 pages.
"Final Office Action", U.S. Appl. No. 12/244,545, (Dec. 7, 2011),16 pages.
"Final Office Action", U.S. Appl. No. 12/413,977, (Nov. 17, 2011),16 pages.
"Final Office Action", U.S. Appl. No. 12/414,476, (Dec. 1, 2011),20 pages.
"Final Office Action", U.S. Appl. No. 12/469,458, (Nov. 17, 2011),15 pages.
"Non-Final Office Action", U.S. Appl. No. 12/244,545, (Aug. 17, 2011),15 pages.
"Non-Final Office Action", U.S. Appl. No. 12/413,977, (Jul. 19, 2011),17 pages.
"Non-Final Office Action", U.S. Appl. No. 12/414,382, (Jul. 26, 2011),9 pages.
"Non-Final Office Action", U.S. Appl. No. 12/414,434, (Aug. 2, 2011),6 pages.
"Non-Final Office Action", U.S. Appl. No. 12/414,455, (Aug. 29, 2011),8 pages.
"Non-Final Office Action", U.S. Appl. No. 12/414,458, (Jul. 6, 2011),8 pages.
"Non-Final Office Action", U.S. Appl. No. 12/414,476, (Aug. 3, 2011),21 pages.
"Non-Final Office Action", U.S. Appl. No. 12/433,605, (Jun. 24, 2011),10 pages.
"Non-Final Office Action", U.S. Appl. No. 12/469,419, (Nov. 9, 2011),15 pages.
"Non-Final Office Action", U.S. Appl. No. 12/469,458, (Jul. 1, 2011),15 pages.
"Non-Final Office Action", U.S. Appl. No. 12/469,480, (Sep. 22, 2011),14 pages.
"Non-Final Office Action", U.S. Appl. No. 12/470,558, (Nov. 22, 2011),9 pages.
"Non-Final Office Action", U.S. Appl. No. 12/484,799, (Aug. 11, 2011),12 pages.
"Non-Final Office Action", U.S. Appl. No. 12/484,845, (Dec. 7, 2011),16 pages.
"Non-Final Office Action", U.S. Appl. No. 12/560,081, (Dec. 7, 2011),16 pages.
"Notice of Allowance", U.S. Appl. No. 12/414,458, (Oct. 31, 2011),2 pages.
"Notice of Allowance", U.S. Appl. No. 12/414,458, (Nov. 29, 2011),2 pages.
"Notice of Allowance", U.S. Appl. No. 12/414,458, (Aug. 10, 2011),6 pages.
La, Nick "Parallax Gallery", Available at <http://webdesignerwall.comtutorials/parallax-gallery/comment-page-1>,(Apr. 25, 2008),16 pages.
Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.
"Final Office Action", U.S. Appl. No. 12/244,545, (Sep. 7, 2012), 23 pages.
"Non-Final Office Action", U.S. Appl. No. 12/413,977, (Jul. 20, 2012), 18 pages.
"Non-Final Office Action", U.S. Appl. No. 12/469,458, (Sep. 21, 2012), 14 pages.
"Non-Final Office Action", U.S. Appl. No. 12/480,969, (Aug. 7, 2012), 15 pages.
"Non-Final Office Action", U.S. Appl. No. 12/484,799, (Aug. 7, 2012), 13 pages.
"Non-Final Office Action", U.S. Appl. No. 13/492,495, (Sep. 17, 2012), 8 pages.
"Notice of Allowance", U.S. Appl. No. 12/414,434, (Aug. 17, 2012), 4 pages.
"Notice of Allowance", U.S. Appl. No. 12/470,558, (Aug. 23, 2012), 2 pages.
"Advisory Action", U.S. Appl. No. 12/414,382, (Jan. 20, 2012), 3 pages.
"Advisory Action", U.S. Appl. No. 12/433,605, (Apr. 5, 2012), 3 pages.
"Extended European Search Report", European Patent Application No. 09818253.8, (Apr. 10, 2012), 7 pages.
"Final Office Action", U.S. Appl. No. 12/414,382, (Dec. 23, 2011), 7 pages.
"Final Office Action", U.S. Appl. No. 12/433,605, (Feb. 3, 2012), 11 pages.
"Final Office Action", U.S. Appl. No. 12/469,480, (Feb. 9, 2012), 17 pages.
"Final Office Action", U.S. Appl. No. 12/484,799, (Apr. 30, 2012), 13 pages.
"Final Office Action", U.S. Appl. No. 12/560,081, (Mar. 14, 2012), 16 pages.
"Non-Final Office Action", U.S. Appl. No. 12/244,545, (Mar. 27, 2012), 18 pages.
"Non-Final Office Action", U.S. Appl. No. 12/414,434, (Jan. 17, 2012), 7 pages.
"Non-Final Office Action", U.S. Appl. No. 12/414,434, (May 31, 2012), 7 pages.
"Non-Final Office Action", U.S. Appl. No. 12/469,419, (May 23, 2012), 13 pages.
"Notice of Allowance", U.S. Appl. No. 12/414,382, (Apr. 4, 2012), 4 pages.
"Notice of Allowance", U.S. Appl. No. 12/414,455, (Jan. 4, 2012), 4 pages.
"Notice of Allowance", U.S. Appl. No. 12/470,558, (Apr. 2, 2012), 7 pages.
Beiber, Gerald et al., "Screen Coverage: A Pen-Interaction Problem for PDA's and Touch Screen Computers", In Proceedings of ICWMC 2007,(Mar. 2007), 6 pages.
Wyatt, Paul "/Flash/the art of parallax scrolling", .net Magazine,(Aug. 1, 2007), pp. 74-76.
"Notice of Allowance", U.S. Appl. No. 12/484,845, (Mar. 16, 2012), 5 pages.
"Final Office Action", U.S. Appl. No. 12/480,969, (Nov. 23, 2012), 18 pages.
"Foreign Office Action", Chinese Application No. 201080015728.1, (Dec. 26, 2012), 9 pages.
"Foreign Office Action", Chinese Application No. 201080015788.3, (Dec. 24, 2012), 10 pages.
"Foreign Office Action", Chinese Application No. 201080023212.1, (Dec. 5, 2012), 10 pages.
"Non-Final Office Action", U.S. Appl. No. 12/414,476, (Nov. 9, 2012), 22 pages.
"Non-Final Office Action", U.S. Appl. No. 12/433,605, (Jan. 11, 2013), 7 pages.
"Non-Final Office Action", U.S. Appl. No. 12/469,480, (Oct. 17, 2012), 16 pages.
"Non-Final Office Action", U.S. Appl. No. 13/492,495, (Dec. 19, 2012), 6 pages.
"Notice of Allowance", U.S. Appl. No. 12/469,419, (Nov. 27, 2012), 13 pages.
"Notice of Allowance", U.S. Appl. No. 12/484,799, (Oct. 22, 2012), 10 pages.
"Extended European Search Report", European Patent Application No. 09822736.6, Dec. 18, 2012, 7 pages.
"Final Office Action", U.S. Appl. No. 12/469,458, Feb. 1, 2013, 19 pages.
"Foreign Office Action", Chinese Application No. 200980142632.9, Jan. 29, 2013, 11 pages.
"Foreign Office Action", Chinese Application No. 200980142661.5, Jan. 21, 2013, 12 pages.
Crouch "Smartphone Wars: Micron's Slide-to-Unlock Patent", Jan. 30, 2013, 2 pages.
"Final Office Action", U.S. Appl. No. 12/414,476, (Apr. 8, 2013), 25 pages.
"Final Office Action", U.S. Appl. No. 12/469,480, (Apr. 10, 2013), 21 pages.

(56) References Cited

OTHER PUBLICATIONS

"Foreign Office Action", Chinese Application No. 200980142644.1, (Apr. 3, 2013), 10 pages.

"Foreign Office Action", Chinese Application No. 201080015728.1, (May 16, 2013), 10 pages.

"Foreign Office Action", Chinese Application No. 201080015788.3, (Jun. 5, 2013), 12 pages.

"Foreign Office Action", Chinese Application No. 201080023212.1, (Jun. 5, 2013), 8 pages.

"Introducing Application Styling for Windows Forms", *Infragistics Software Manual, Version* 7.3.20073.1043, (Nov. 2007), 95 pages.

"Non-Final Office Action", U.S. Appl. No. 12/469,458, (May 3, 2013), 21 pages.

"Non-Final Office Action", U.S. Appl. No. 12/480,969, (Apr. 4, 2013), 22 pages.

"Notice of Allowance", U.S. Appl. No. 13/492,495, (Apr. 26, 2013), 5 pages.

"Foreign Office Action", Chinese Application No. 200980142632.9, (Jun. 14, 2013), 6 pages.

"Final Office Action", U.S. Appl. No. 12/433,605, (Jul. 17, 2013), 13 pages.

"Foreign Office Action", Japanese Application No. 2012-503523, (Apr. 22, 2013), 5 Pages.

"Foreign Office Action", Chinese Application No. 200980139831.4, (Jul. 1, 2013), 12 pages.

"Final Office Action", U.S. Appl. No. 12/480,969, (Jul. 24, 2013), 19 pages.

"Foreign Office Action", Chilean Application No. 2379-2011, (Jul. 3, 2013), 8 pages.

"Foreign Office Action", Chinese Application No. 200980142644.1, (Aug. 20, 2013), 9 pages.

"Non-Final Office Action", Application No. 12/469,480, (Aug. 27, 2013), 22 pages.

"EP Search Report", European Application No. 10762112.0, (Aug. 2, 2013), 7 Pages.

"Foreign Office Action", Japanese Application No. 2011-533353, (Jul. 5, 2013), 9 pages.

"Foreign Office Action", Chinese Application No. 200980142661.5, (Sep. 24, 2013), 8 pages.

\* cited by examiner

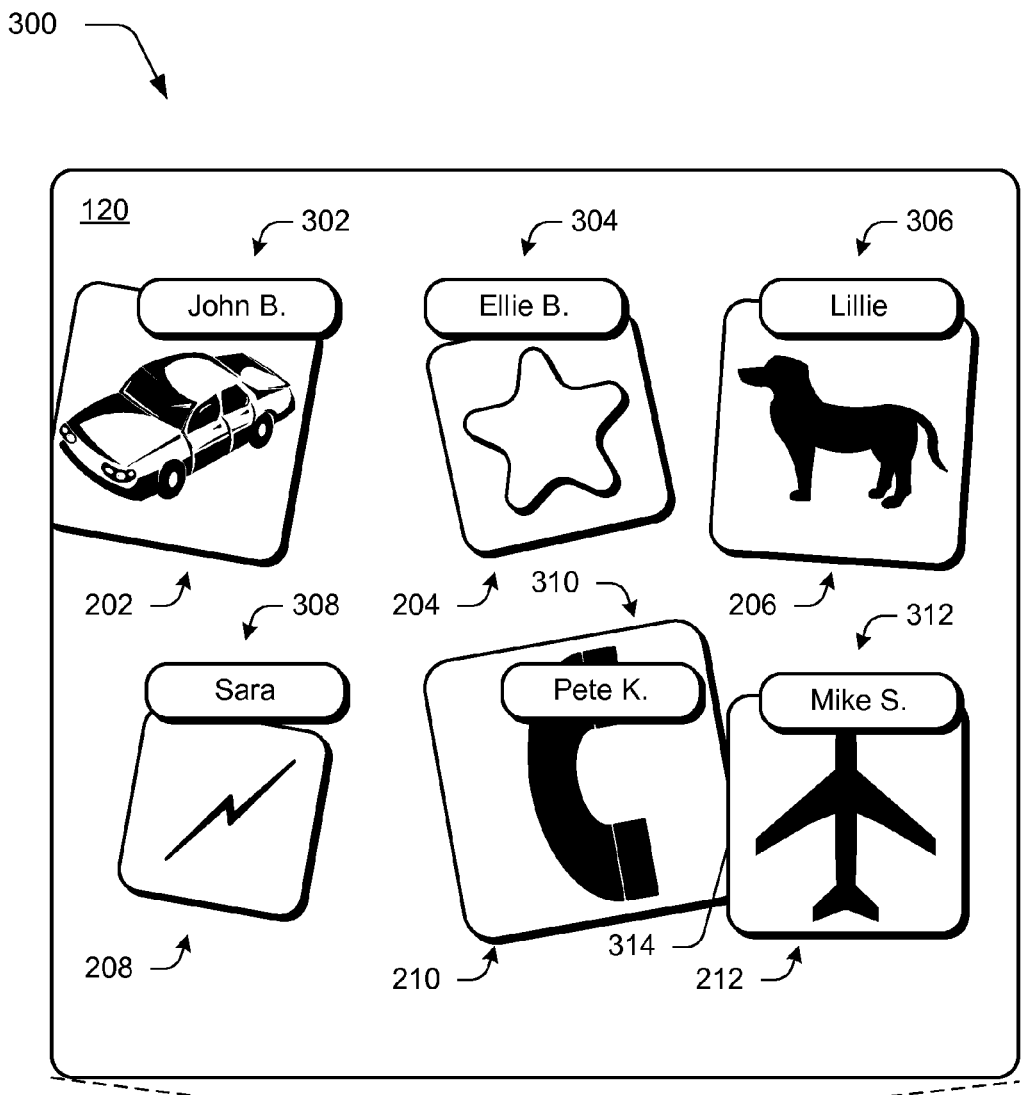
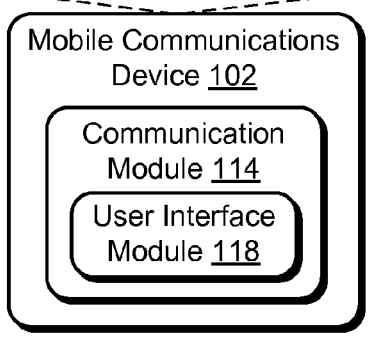
Fig. 3

600

602
Determine, by a mobile communications device, that first and second icons are to be displayed at first and second locations in a user interface

604
Determine, by the mobile communications device, respective first and second angles of rotation that are defined for the first and second locations

606
Display on a display device of the mobile communication device at least a portion of the first icon at the first angle of rotation at the first location in the user interface

608
Display on a display device of the mobile communication device at least a portion of the second icon at the second angle of rotation at the first second in the user interface, the second angle of rotation being different than the first angle of rotation

*Fig. 6*

LOCATION BASED DISPLAY CHARACTERISTICS IN A USER INTERFACE

RELATED APPLICATIONS

This application claims priority under 35 U.S.C. Section 119(e) to U.S. Provisional Patent Applications Nos. 61/107,945, 61/107,935, and 61/107,921, each of which was filed on Oct. 23, 2008, the entire disclosures of which are hereby incorporated by reference in their entirety.

BACKGROUND

Mobile communication devices (e.g., wireless phones) have become an integral part of everyday life. However, the form factor employed by conventional mobile communications devices is typically limited to promote mobility of the mobile communications device. For example, the mobile communications device may have a relatively limited amount of display area when compared to a conventional desktop computer, e.g., a PC. In another example, the mobile communications device may have limited input functionality (e.g., a keyboard) when compared with a conventional desktop computer. Therefore, conventional techniques used to interact with a desktop computer may be inefficient when employed by a mobile communications device.

SUMMARY

Location-based display characteristics in a user interface are described. In an implementation, a determination is made by mobile communications device that icon is to be displayed at a particular location in the user interface. A display characteristic is applied by the mobile communications device that is defined for the particular location such that a display of the icon is changed. The icon is displayed having an applied display characteristic on the display device of the mobile communications device at the particular location in the user interface.

In an implementation, a determination is made by a mobile communications device that first and second icons are to be displayed at first and second locations in a user interface. A determination is also made by the mobile communications device of respective first and second angles of rotation that are defined for the first and second locations. At least a portion of the first icon is displayed on a display device of the mobile communication device at the first angle of rotation. At least a portion of the second icon is displayed on the display device of the mobile communication device at the second angle of rotation.

In an implementation, a mobile communications device includes a display device and one or more modules that are configured to provide telephone functionality. The one or more modules are also configured to display a user interface on the display device that has a plurality of locations that are arranged according to a non-uniform grid. Each of the locations has a defined display characteristic to be applied to a respective one or more of a plurality of icons that is positioned at the location and a display of a first said icon at a first location overlaps a display of a second icon at a second location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is an illustration showing a system in which icons are displayed in a user interface at respective locations using display characteristics as defined in FIG. 2.

FIG. 6 is a flow diagram depicting a procedure in an example implementation in which a display characteristic is applied based on the amount of rotation defined for respective locations in a user interface at which respective icons are to be displayed.

DETAILED DESCRIPTION

Overview

Display devices employed by mobile communications devices (e.g., mobile phones, netbooks, and so on) typically have a limited amount of available display area when compared with a desktop environment. Therefore, techniques that were traditionally employed in a conventional desktop environment may be inefficient when employed by a mobile communications device. For example, one such technique to organize a conventional desktop environment involved arranging content and representations of content according to a rigid grid within the user interface, which may limit the amount of information that may be displayed in a user interface at a particular time.

Location-based display characteristics in a user interface are described. In one or more implementations, a non-uniform grid is employed that allows icons (e.g., representations of applications or content) to be laid out according to the grid to resemble a magazine print type layout. Additionally, the grid may employ functionality to allow representations to overlap each other, thereby promoting a natural "look and feel" to the user interface as well as increased display efficiency.

For example, the grid itself (although not visible) may be used as a guide on which icons are displayed within the user interface. The icons displayed within a user interface according to the grid may fill the areas of the grid but may also be designed such that the icons may overlap the edges of the grid. In this way, a natural layout may be achieved. Additionally, animations may also be employed to give an increased feeling of realism to interaction with the user interface.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other mobile devices are also contemplated, such as personal digital assistants, mobile music players, dedicated messaging devices, portable game devices, netbooks, and so on.

Example Implementations

Figure 1:
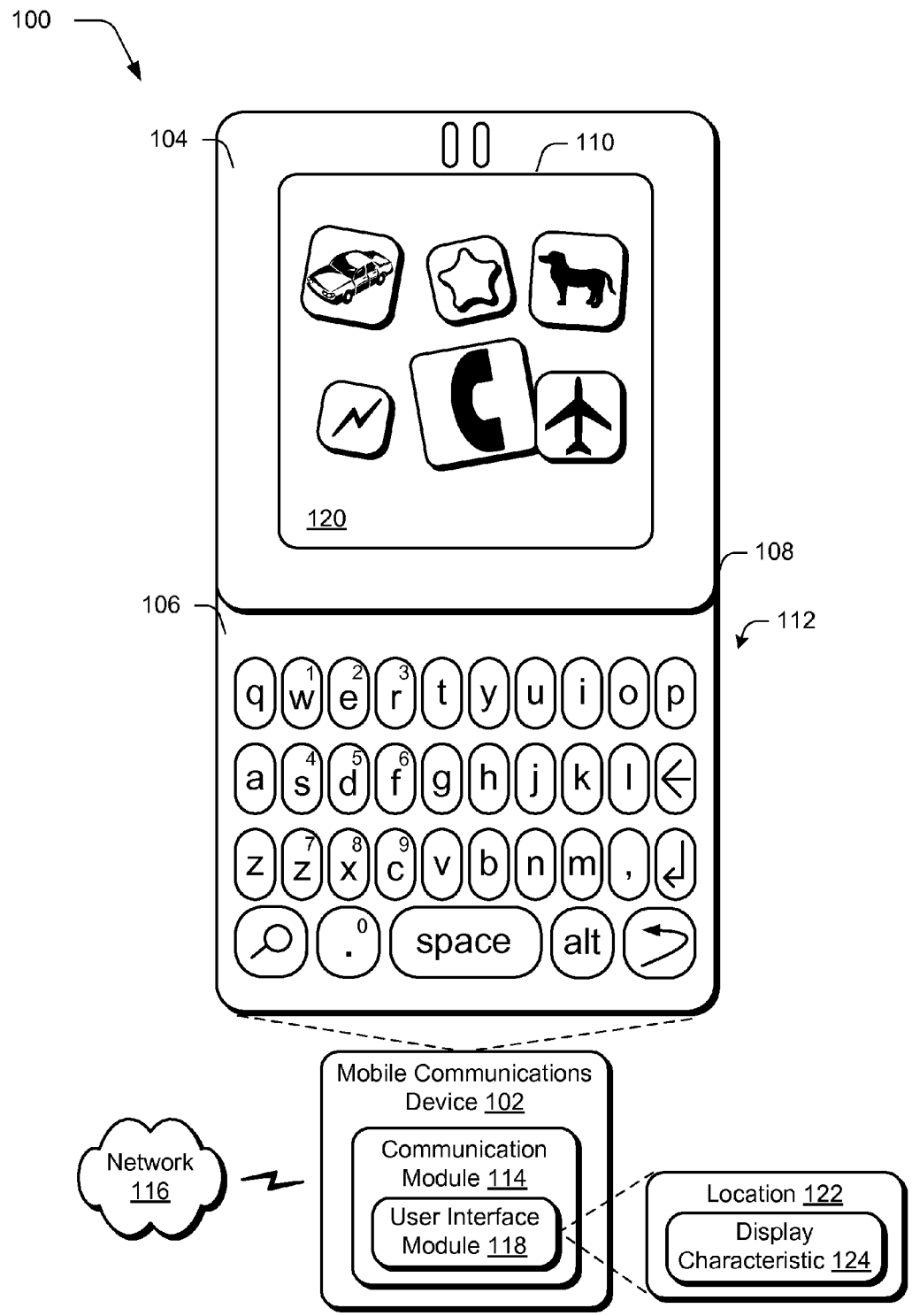
FIG. 1 is an illustration of an example implementation of a mobile communications device in accordance with one or more embodiments of devices, features, and systems for mobile communications.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration in which the mobile communications device 102 is "closed" and a configuration illustrated in FIG. 1 in which the mobile communications device 102 is "open."

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of data, such as a caller identification (ID), icons as illustrated, email, multimedia messages, Internet browsing, game play, music, video and so on. In an implementation, the display device 110 may also be configured to function as an input device by incorporating touchscreen functionality, e.g., through capacitive, surface acoustic wave, resistive, optical, strain gauge, dispersive signals, acoustic pulse, and other touchscreen functionality.

The second housing 106 is illustrated as including a keyboard 112 that may be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. In this example configuration, at least a majority of the keys of the keyboard 112 (i.e., the physical keys) is exposed such that the exposed keys are available for use to provide inputs. The open configuration results in an extended form factor of the mobile communications device 102 as contrasted with the form factor of the mobile communications device 102 in the closed configuration. In an implementation, the planes of the first and second housings 104, 106 that are used to define the extended form factor are parallel to each other, although other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be particularly convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116. For example, the communication module 114 may include telephone functionality to make and receive telephone calls. The communication module 114 may also include a variety of other functionality, such as to form short message service (SMS) text messages, multimedia messaging service (MMS) messages, emails, status messages for a social network, and so on. A user, for instance, may form a status message for communication via the network 116 to a social network website. The social network website may then publish the status message to "friends" of the user, e.g., for receipt by the friends via a computer, respective mobile communications device, and so on. A variety of other examples are also contemplated, such as blogging, instant messaging, and so on.

The mobile communications device 102 is also illustrated as including a user interface module 118. The user interface module 118 is representative of functionality of the mobile communications device 102 to generate, manage, and/or output a user interface 120 for display on the display device 110. A variety of different techniques may be employed to generate the user interface 102.

For example, the user interface module 118 may configure the user interface 120 to include a plurality of locations. Each of these locations may have a corresponding display characteristic defined for it, which is illustrated in FIG. 1 as location 122 having display characteristic 124. In this way, the user interface module 118 may determine "how" an icon or content is displayed by "where" the icon or content is to be displayed in the user interface 120, further discussion of which may be found in relation to the following figure.

Figure 2:
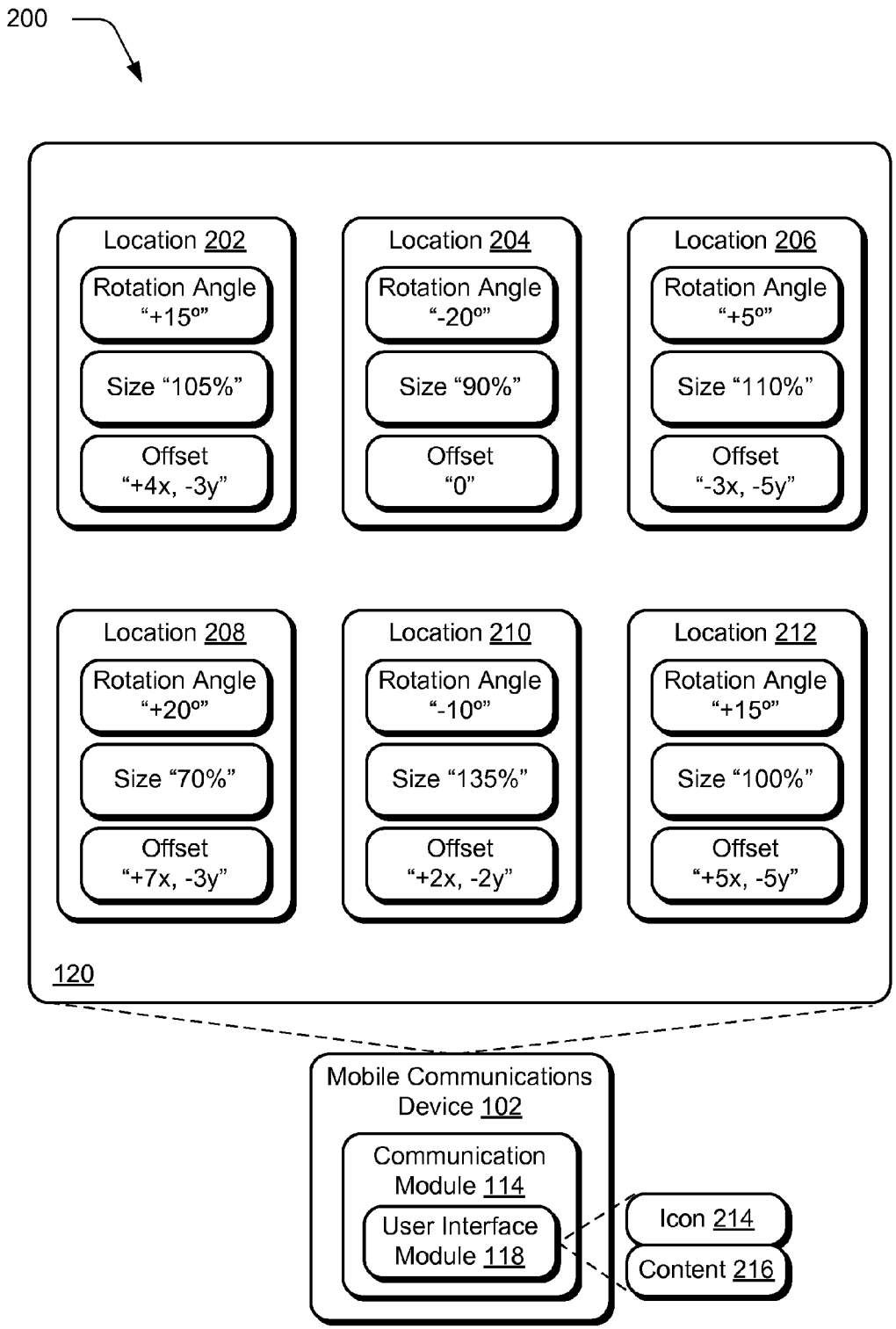
FIG. 2 is an illustration showing a user interface of FIG. 1 in greater detail as having a plurality of locations, each having a plurality of display characteristics defined for application to icons and/or content.

FIG. 2 illustrates an example system 200 showing the user interface 120 of FIG. 1 in greater detail as having a plurality of locations 202-212, each having a plurality of display characteristics defined to be applied to icons and/or content. Each of the locations 202-212 illustrated in FIG. 2 are unique such that the locations 202-212 do not share a single point in the user interface 120.

A variety of different display characteristics may be defined for each of the locations 202-212. In illustrated example, each of the locations 202-212 has a defined amount of rotation illustrated as a rotation angle, a size defined as a percentage, and an offset defined using x/y coordinates. For example, location 202 has defined display characteristics that include a rotation angle of "+15°," a size of "105%," and an offset defined using coordinates "+4x, −3y." Location 204, however, has defined display characteristics that include a rotation angle of "−20°," a size of "90%," and an offset of "zero." Locations 206, 208, 210, 212 also have similarly defined display characteristics, respectively. These display characteristics may then be applied by the user interface module 124 to an icon 214 or other content 216 that is to be displayed at the respective location, further discussion of which may be found in relation to FIG. 3.

Although the locations 202-212 are illustrated as following a general grid pattern in FIG. 2, the grid is not uniform upon display through use of the previously described offsets as shown in FIG. 3. A variety of other arrangements are also contemplated without departing from the spirit and scope thereof, such as use of a conventional uniform grid in conjunction with one or more of the display characteristics.

FIG. 3 illustrates a system 300 in which icons 302-312 are displayed in the user interface 120 at respective locations 202-212 using display characteristics defined in FIG. 2. In this example, the user interface module 118 has configured the user interface 120 to display the icons 302-312 at locations 202-212. In this example, the icons represent contacts that are selectable to initiate a telephone call using a corresponding number defined for that contact. Each of the locations 202-212 has display characteristics that are defined for that location. Accordingly, the user interface module 118 may apply the display characteristics that are defined for that location to an icon that is positioned at that location.

For example, icon 302 is displayed at location 202 in the user interface 120. Accordingly, the user interface module 118 applies display characteristics for the location 202 to at least a portion of icon 302. As previously illustrated in FIG. 2, the display characteristic for location 202 include a rotation angle of "+15°," a size of "105%," and an offset defined using coordinates "+4x, −3y." Likewise, display characteristics of location 204 are applied to icon 304 by the user interface module 118, which include a rotation angle of "−20°," a size of "90%," and an offset of "zero." This process may be repeated for the icons 306-312 using display characteristics that are defined for the respective locations 206-212.

As illustrated in FIG. 3, the user interface module 120 may apply a display characteristic to a portion of the icon and not another portion of the icon. For instance, the display characteristics for location 202 are illustrated as being applied to an image portion of icon 302 but not a text description portion of icon 302. Thus, in this example the text description portions of each of the icons 302-312 remain aligned with respect to one another and/or with respect to the user interface 120. A variety of other examples are also contemplated.

The use of the display characteristics may give a designer increased flexibility in designing the user interface 120 over conventional rigid structures. For example, these techniques may be applied such that an overlap 314 occurs between two or more of the icons, e.g., icons 310, 312. Conflict resolution techniques may be employed by the user interface module 118 to determine which of the icons 310, 312 is to be displayed "on top," such as based on an amount of time that has passed since interaction. In another example, at least a portion of the icon 302 is not displayed in the user interface 120 with the rest of the icon 302. In a further example, the display characteristics may be defined by the user interface module 118 in a static or dynamic manner, further discussion of which may be found in relation to the following figure.

Figure 4:
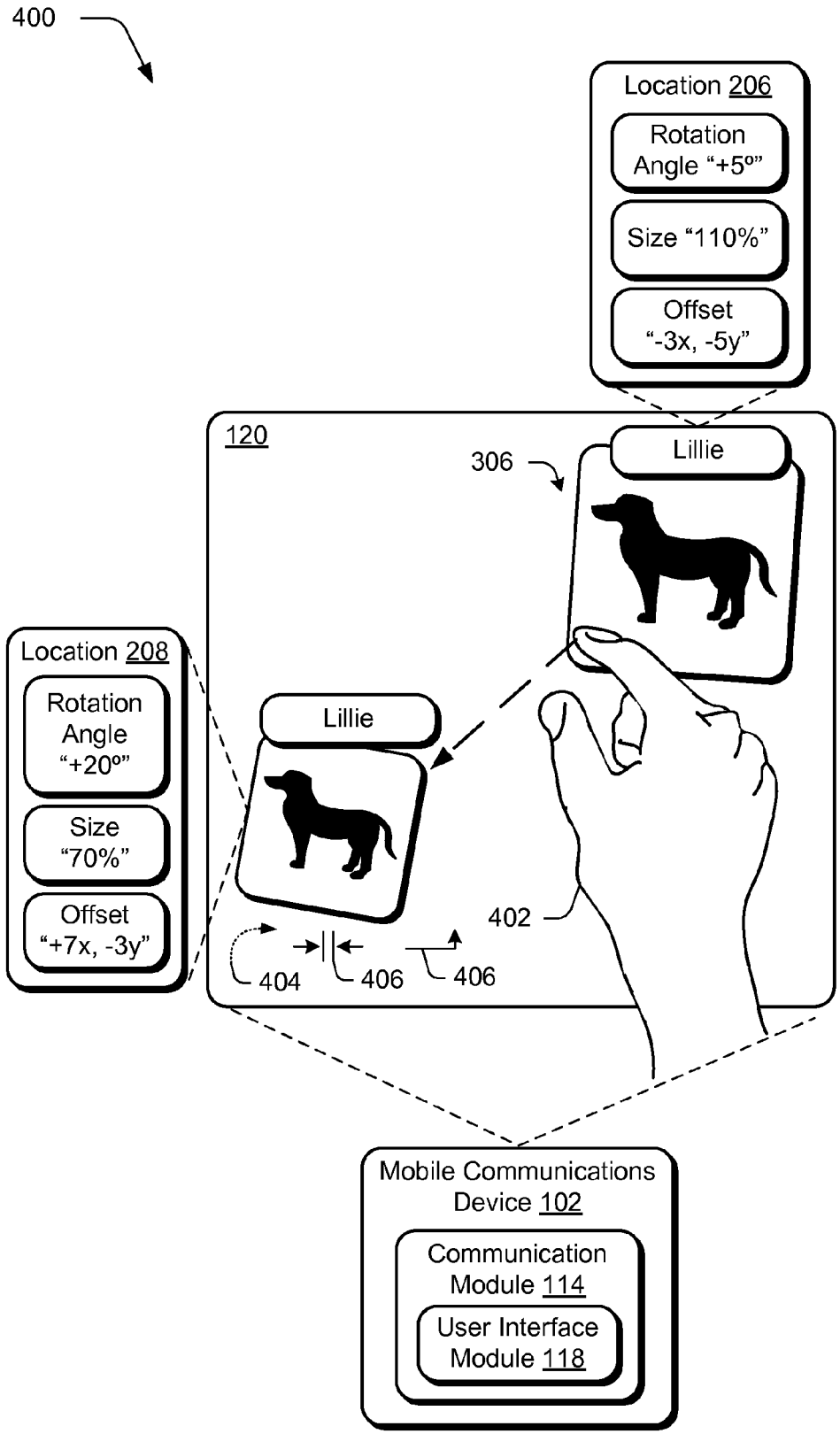
FIG. 4 is an illustration showing an example system in which display characteristics that are defined for particular locations in a user interface remain static for at least a period of time such that movement of an icon from a first location to a second location results in an application of different display characteristics.

FIG. 4 illustrates an example system 400 in which display characteristics that are defined for particular locations remain static for at least a period of time such that movement of an icon from a first location to a second location results in an application of different display characteristics. In the illustrated implementation, the icon 206 is moved from location 206 to location 208 in the user interface 120 in response to a drag gesture received via touchscreen functionality of the display device 110 of FIG. 1 from a user's hand 402.

In this example, the display characteristics remain set for at least a period of time. Consequently, at location 206, the icon 306 is displayed in the user interface 120 with a rotation angle of "+5°," size of "110%," and an offset of "−3x, −5y." At location 208, however, the icon 306 is to be displayed in the user interface 120 with a rotation angle of "+20°," size of "70%," and an offset of "+7x, −3y." In an implementation, an animation is used to provide a transition between the locations 206, 208.

For example, as the icon 306 is dragged across the user interface 120, the icon 306 may retain the display characteristics of the initial location, e.g., location 206. When an endpoint is reached (e.g., the drag gesture is let go), a "shift and settle" animation may be utilized to apply the display characteristics of the end location, e.g., location 208. For instance, the animation may apply a rotation 404, a resizing 406, and a shift 408 to transition from the display characteristics of location 206 to the display characteristics of location 208.

Although the illustrated example was described using static display characteristics, the display characteristics may also be determined dynamically by the user interface module 118. For example, new display characteristics may be dynamically determined each time an icon is positioned or repositioned in the user interface 120. In another example, the display characteristics may be determined upon creation of the icon in a particular location in the user interface and maintained for as long as the icon remains displayed in the user interface 120. A variety of other examples are also contemplated, further discussion of which may be found in relation to the following procedures.

Example Procedures

The following discussion describes user interface techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-400 of FIGS. 1-4, respectively.

Figure 5:
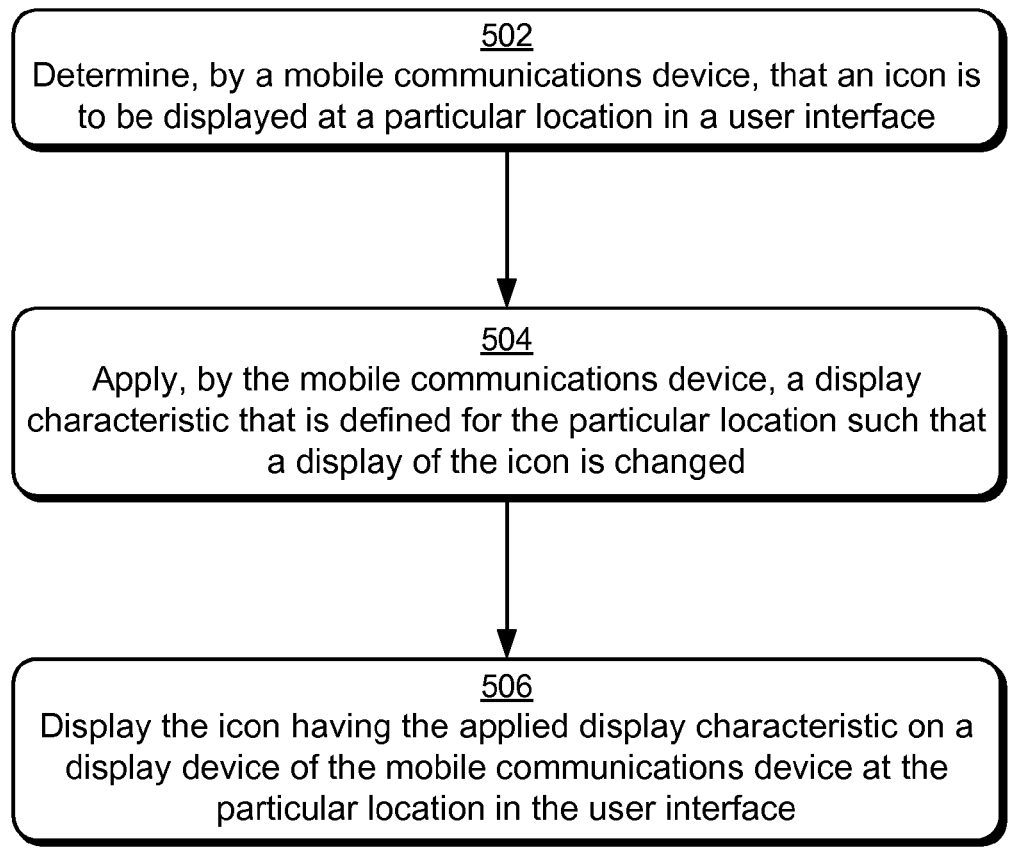
FIG. 5 is a flow diagram depicting a procedure in an example implementation in which a display characteristic defined for a particular location in a user interface is applied to an icon to be displayed at the location.

FIG. 5 depicts a procedure 500 in an example implementation in which the display characteristics defined for a particular location in a user interface is applied to an icon to be displayed at the location. A determination is made by a mobile communications device that an icon is to be displayed at a particular location in a user interface (block 502). For example, the determination may be made in response to a repositioning of the icon as previously described in relation to FIG. 4. In another example, the determination may be made when an icon is to be initially displayed in the user interface 120, such as upon startup, a page refresh, navigation through hierarchical pages through the user interface 120 (e.g., folders and subfolders), and so on.

A mobile communications device applies a display characteristic that is defined for the particular location such that a display of the icon is changed by the display characteristic (block 504). For example, the display characteristic may specify an effect to be applied, such as rotation, resize, and so on such that a display of the icon is changed according to the effect of the display characteristic.

The icon is then displayed having the applied display characteristic on a display device of the mobile communications device at the particular location in the user interface (block 506). For example, the icon 302 and be displayed at location 202 in the user interface 12 zero on the display device 110 of the mobile communications device 102.

FIG. 6 depicts a procedure 600 in an example implementation in which a display characteristic that defines an amount of rotation of at least a portion of respective icons is applied based on the amount of rotation defined for respective locations in a user interface at which the respective icons are to be displayed. A determination is made by a mobile communications device that first and second icons are to be displayed at first and second locations in a user interface (block 602). For example, the user interface module 118 may detect that navigation is to be performed from one hierarchical level of the user interface 120 to another that includes icons for display, e.g., from folder to sub-folder and vice versa.

The determination is made by the mobile communications device of respective first and second angles of rotation that are defined for the first and second locations (block 604). For example, the determination may be made via a lookup to locate values (e.g., from a file, table, and so on) that were defined before it was determined that the first and second icons were to be displayed at the first and second locations. In another example, the determination may be be dynamically in response to the determination of the first and second icons are to be displayed at the first and second locations. A variety of other examples are also contemplated.

At least a portion of the first icon is displayed on a display device of the mobile communications device at the first angle of rotation at the first location in the user interface (block 606). Additionally at least a portion of the second icons is displayed on the display device of the mobile communication device at the second angle of rotation of the second location in the user interface, the second angle of rotation be different than the first angle of rotation (block 608). Thus, in this example the icons may be displayed concurrently in the user interface 120 at different angles of rotation. A variety of other examples are also contemplated, such as resizing, offsets, and so on.

Example Device

Figure 7:
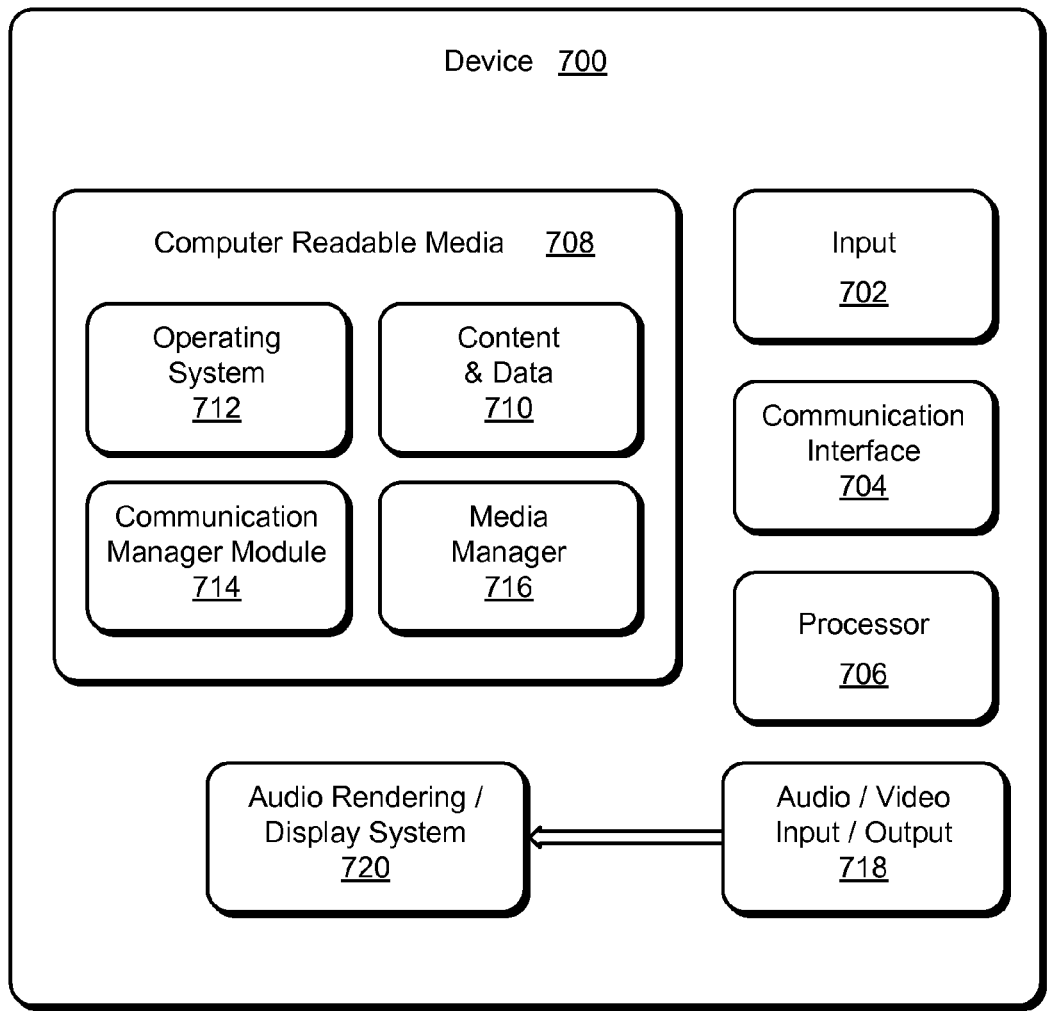
FIG. 7 illustrates various components of an example device that can be implemented in various embodiments as any type of a mobile device to implement embodiments of devices, features, and systems for mobile communications.

FIG. 7 illustrates various components of an example device 700 that can be implemented in various embodiments as any type of a mobile device to implement embodiments of devices, features, and systems for mobile communications. For example, device 700 can be implemented as any of the mobile communications devices 72 described with reference to respective FIGS. 1-6. Device 700 can also be implemented to access a network-based service, such as a content service.

Device 700 includes input(s) 702 that may include Internet Protocol (IP) inputs as well as other input devices, such as the keyboard 112 of FIG. 1. Device 700 further includes communication interface(s) 704 that can be implemented as any one or more of a wireless interface, any type of network interface, and as any other type of communication interface. A network interface provides a connection between device 700 and a communication network by which other electronic and computing devices can communicate data with device 700. A wireless interface enables device 700 to operate as a mobile device for wireless communications.

Device 700 also includes one or more processors 706 (e.g., any of microprocessors, controllers, and the like) which process various computer-executable instructions to control the operation of device 700 and to communicate with other electronic devices. Device 700 can be implemented with computer-readable media 708, such as one or more memory components, examples of which include random access memory (RAM) and non-volatile memory (e.g., any one or more of a read-only memory (ROM), flash memory, EPROM, EEPROM, etc.).

Computer-readable media 708 provides data storage to store content and data 710, as well as device applications and any other types of information and/or data related to operational aspects of device 700. For example, an operating system 712 can be maintained as a computer application with the computer-readable media 708 and executed on processor(s) 706. Device applications can also include a communication manager module 714 (which may be used to provide telephonic functionality) and a media manager 716.

Device 700 also includes an audio and/or video output 718 that provides audio and/or video data to an audio rendering and/or display system 720. The audio rendering and/or display system 720 can be implemented as integrated component(s) of the example device 700, and can include any components that process, display, and/or otherwise render audio, video, and image data. Device 700 can also be implemented to provide a user tactile feedback, such as vibrate and haptics.

The communication manager module 714 is further illustrated as including a keyboard module 722. The keyboard module 722 is representative of functionality employ one or more of the techniques previously described in relation to FIGS. 1-6.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining, by a mobile communications device, that an icon is to be displayed at a particular location in a user interface within a non-uniform grid that allows selectable positioning of icons to arrange icons in the user interface into a non-uniform arrangement, the non-uniform grid having a plurality of locations associated with respective display characteristics that are specified separately for each of the plurality of locations, the non-uniformity derived from individually offsetting, resizing, and rotating each of the icons arranged within the non-uniform grid according to the respective display characteristics specified for the locations at which the icons are located; applying, by the mobile communications device, display characteristics defined for the particular location such that a display of the icon is changed; and displaying the icon having the applied display characteristics on a display device of the mobile communications device at the particular location in the user interface.

2. A method as described in claim 1, wherein: the display characteristics defined at a first said location causes the icon to be displayed differently than at a second said location in the user interface.

3. A method as described in claim 2, wherein the display characteristics defined at the first said location are different than the display characteristics defined at the second said location.

4. A method as described in claim 1, wherein a display characteristic for the particular location specifies an amount of rotation to be applied to at least a portion of the icon.

5. A method as described in claim 4, wherein the amount of rotation is not applied to a text description of the icon.

6. A method as described in claim 1, wherein a display characteristic for the particular location specifies a size of the icon.

7. A method as described in claim 1, wherein a display characteristic for the particular location specifies an offset to be applied to at least a portion of the icon.

8. A method as described in claim 1, further comprising:
determining, by the mobile communications device, that the icon is to be displayed at a new location in a user interface;
applying, by the mobile communications device, display characteristics for the new location; and
displaying the icon having the applied display characteristics for the new location on the display device of the mobile communications device at the new location in the user interface, wherein the display characteristics for the new location are different than the display characteristics for the particular location.

9. A method as described in claim 8, further comprising displaying the icon using an animation to transition from the location to the new location that gives an appearance that the icon shifts and settles at the new location to apply the display characteristic for the new location, the transition of the icon is animated such that the icon transitions from having the display characteristics defined for the particular location applied to having the display characteristics defined for the new location applied.

10. A method as described in claim 1, wherein the icon represents a contact that is selectable via interaction with the user interface to initiate a telephone call.

11. A method as described in claim 1, wherein the icon represents content.

12. A method comprising:
determining, by a mobile communications device, that first and second icons are to be displayed at first and second locations in a user interface, the first and second locations included in a grid that enables a plurality of icons employed by the user interface to be arranged in a non-uniform and non-rigid layout, the plurality of icons being positioned at a plurality of locations in the user interface that have individual display characteristics to enable individual repositioning of the plurality of icons throughout the plurality of locations, the non-uniformity and non-rigidity of the layout derived from individually offsetting, resizing and rotating each of the plurality of icons according to the display characteristics defined for the respective locations at which the icons are positioned;
determining, by the mobile communications device, respective first and second angles of rotation that are defined for the first and second locations, the first angle of rotation being determined from a first set of display characteristics specified for the first location and the second angle of rotation being determined from a second set of display characteristics specified for the second location;
displaying on a display device of the mobile communication device at least a portion of the first icon at the first angle of rotation at the first location in the user interface; and
displaying on a display device of the mobile communication device at least a portion of the second icon at the second angle of rotation at the second location in the user interface, the second angle of rotation being different than the first angle of rotation.

13. A method as described in claim 11, wherein the displaying of the first icon in the user interface overlaps the displaying of the second icon in the user interface.

14. A method as described in claim 11, wherein the determining of the respective first and second angles of rotation for the first and second locations is computed after the determining that the first and second icons are to be displayed at the first and second locations in the user interface.

15. A method as described in claim 11, wherein the determining of the respective first and second angles of rotation for the first and second locations is performed by locating values assigned for the first and second angles of rotation before the determining that the first and second icons are to be displayed at the first and second locations in the user interface.

16. A method as described in claim 11, wherein the determining of the respective first and second angles of rotation for the first and second locations is computed dynamically.

17. A mobile communications device comprising:
a display device; and
one or more modules that are configured to provide telephone functionality and to display a user interface on the display device that has a plurality of locations that are arranged according to a non-uniform grid such that:
each of the locations has defined display characteristics to be applied to a respective one of a plurality of icons that is positioned at the location, the defined display characteristics being specified separately for each of the locations;
the non-uniform grid enables selectable positioning of the plurality of icons in non-uniform and non-rigid arrangements within the user interface, the non-uniformity derived from individually offsetting, resizing, and rotating each of the plurality of icons according to the display characteristics defined for the respective locations at which the icons are located; and
a display of a first said icon at a first said location overlaps a display of a second said icon at a second said location.

18. A mobile communications device as described in claim 17, wherein the display characteristics specify an amount of rotation to be applied to a respective icon.

19. A mobile communications device as described in claim 17, wherein at least one of the icons represents a contact that is selectable via interaction with the user interface to cause the telephone functionality to initiate a telephone call.

\* \* \* \* \*